(12) United States Patent
Kim et al.

(10) Patent No.: US 11,594,347 B2
(45) Date of Patent: Feb. 28, 2023

(54) COMPOSITION FOR COATING INSULATED WIRE COMPRISING HEAT DISSIPATION SILICONE ELASTOMER COMPOUND HAVING LIGHT SHIELDING LAYER

(71) Applicant: KOREA INSTITUTE OF INDUSTRIAL TECHNOLOGY, Cheonan-si (KR)

(72) Inventors: Sang Bum Kim, Suwon-si (KR); Byoung Kwon Choi, Cheonan-si (KR); Eun Soo Park, Seoul (KR)

(73) Assignee: KOREA INSTITUTE OF INDUSTRIAL TECHNOLOGY, Cheonan-si (KR)

( * ) Notice: Subject to any disclaimer, the term of this patent is extended or adjusted under 35 U.S.C. 154(b) by 289 days.

(21) Appl. No.: 17/086,458

(22) Filed: Nov. 2, 2020

(65) Prior Publication Data
US 2021/0134479 A1 May 6, 2021

(30) Foreign Application Priority Data
Nov. 4, 2019 (KR) .......................... 10-2019-0139688

(51) Int. Cl.
*H01B 3/46* (2006.01)
*H01B 7/02* (2006.01)
(Continued)

(52) U.S. Cl.
CPC .............. *H01B 3/46* (2013.01); *C08G 77/392* (2013.01); *C08K 3/22* (2013.01); *C08K 7/08* (2013.01);
(Continued)

(58) Field of Classification Search
CPC ..... C23C 2222/20; C23C 22/83; C23C 22/05; C23C 22/07; C23C 22/08; C23C 22/68; D07B 1/0666; H01B 7/421; H01B 7/0225; H01B 3/46; H01B 3/441; H01B 1/22; H01B 13/14; H01B 3/301; H01B 3/305; H01B 3/445; H01B 3/47; H01B 7/02;
(Continued)

(56) References Cited

U.S. PATENT DOCUMENTS 1,995,302 A * 3/1935 Goldstein ............... A61M 5/44
604/114
2,274,839 A * 3/1942 Marick ................... F24H 1/142
219/547
(Continued)

FOREIGN PATENT DOCUMENTS

CN 1227675 C * 11/2005 ............... H01B 3/04
JP 2009-197048 A 9/2009
(Continued)

OTHER PUBLICATIONS

Korean Notice of Allowance for KR Application No. 10-2019-0139688 dated Jul. 7, 2021.
(Continued)

*Primary Examiner* — Krystal Robinson
(74) *Attorney, Agent, or Firm* — Cantor Colburn LLP (57) ABSTRACT

The present invention relates to a coated insulated wire having improved heat dissipation properties, insulation properties, flame retardancy, and lightweight properties; and a method of manufacturing the same.

8 Claims, 3 Drawing Sheets

(51) Int. Cl.
*H01B 7/295* (2006.01)
*H01B 7/42* (2006.01)
*H01B 3/47* (2006.01)
*C08L 83/08* (2006.01)
*C08G 77/392* (2006.01)
*C08K 3/22* (2006.01)
*C08K 7/08* (2006.01)
*C08K 9/06* (2006.01)

(52) U.S. Cl.
CPC ............... *C08K 9/06* (2013.01); *C08L 83/08* (2013.01); *H01B 3/47* (2013.01); *H01B 7/0225* (2013.01); *H01B 7/295* (2013.01); *H01B 7/421* (2013.01); *C08L 2201/02* (2013.01); *C08L 2201/08* (2013.01); *C08L 2203/202* (2013.01)

(58) Field of Classification Search
CPC .......... H01B 7/282; H01B 7/295; H01B 1/20; H01B 1/24; H01B 13/06; H01B 13/22; H01B 5/12; H01B 3/04; H01B 3/40; H01B 3/42; H01B 7/28; H01B 7/2806; H01B 7/292; H01B 1/124; H01B 5/14; H01B 7/04; H01B 7/043; H01B 7/18; H01B 9/005; H02G 15/1813; H02G 15/18; H02G 15/1806; H02G 15/115; H02G 3/30; H02G 5/10; H02G 11/00; H02G 11/02; H02G 3/0406; H02G 3/0481; H02G 3/263; C08L 2201/02; C08L 2203/202; C08L 83/08
See application file for complete search history.

(56) References Cited

U.S. PATENT DOCUMENTS

| | | | | |
|---|---|---|---|---|
| 3,589,263 A | * | 6/1971 | Casey | G03D 5/04 396/577 |
| 3,686,731 A | * | 8/1972 | Koori | B32B 15/06 427/292 |
| 4,038,519 A | * | 7/1977 | Foucras | H05B 3/58 219/505 |
| 4,352,007 A | * | 9/1982 | Baker | B05C 17/00523 219/535 |

FOREIGN PATENT DOCUMENTS

| | | |
|---|---|---|
| KR | 10-2007-0088487 A | 8/2007 |
| KR | 10-2016-0135690 A | 11/2016 |
| KR | 10-2018-0137931 A | 12/2018 |
| KR | 10-2015596 B1 | 8/2019 |

OTHER PUBLICATIONS

"Development of heat-sink silicone compound for extrusion/coating using metal coated short fiber," Korea Institute of Industrial Technology Research Report, Nov. 15, 2018.

Korean Office Action for Application No. 10-2019-0139688 dated Jan. 16, 2021, in conformance with MPEP 609—Concise explanation of the relevance includes issue date of KR OA and references cited therein.

* cited by examiner

EXAMPLE 1

COMPARATIVE EXAMPLE 1

FIG. 3

EXAMPLE 1

COMPARATIVE EXAMPLE 1

COMPOSITION FOR COATING INSULATED WIRE COMPRISING HEAT DISSIPATION SILICONE ELASTOMER COMPOUND HAVING LIGHT SHIELDING LAYER

TECHNICAL FIELD

The present invention relates to a method of applying a heat dissipation silicone elastomer compound, which is prepared by adding an anti-tracking agent surface-treated with a silane and chopped strands of a metal-coated fiber yarn treated with an adhesion enhancer to a silicone elastomer compound, to an insulated wire, more particularly, to a method of manufacturing an insulated wire including: a first step of preparing a heat dissipation silicone elastomer compound; a second step of manufacturing an insulated wire by forming an insulating layer on the outer circumference of a conductor coated with an adhesion enhancer; a third step of forming a light shielding layer on the outer circumference of the insulated wire by braiding a metallic fiber yarn; and a fourth step of forming a coating layer on the outer circumference of the light shielding layer using the heat dissipation silicone elastomer compound, and a coated insulated wire manufactured thereby and having improved heat dissipation properties, insulation properties, flame retardancy, and lightweight properties.

BACKGROUND ART

In recent years, various digital electronic devices (e.g., smartphones or tablet PCs) have become necessities in our daily lives, and there has recently been a trend called device convergence in which different devices having various functions are integrated into a single device.

In such high-density integration technology, heat, as a major cause of lifespan shortening, performance deterioration, occurrence of failure, etc. of electronic devices, is inevitably generated, and thus the necessity of heat dissipation technology that may effectively dissipate heat to the outside is increasing. Since future electronic devices are expected to be more compact and multifunctional, the necessity and importance of heat management technology is predicted to gradually increase.

Although the development of electronic devices is fundamentally based on high-density integration of semiconductors, heat, as a major cause of performance deterioration, shortening of lifespan, and occurrence of failure in the electronic devices, is inevitably generated as a consequence of the high-density integration technology, and thus heat dissipation technology has drawn attention as a way of effectively dissipating heat to the outside.

Therefore, it is expected that future electronic devices will become lighter, thinner, more compact, smaller, and more multifunctional, and thus the necessity and importance of heat dissipation technology and development of materials will increase.

In particular, with the improvement of performance of vehicles, various automotive parts are being replaced with electronic parts, and the problem of heat generation is gradually increasing due to miniaturization, ultra-thinning, and high densification of the electronic parts such that the demand for heat dissipation materials tends to increase in various fields of automobiles.

Due to low fuel efficiency of vehicles and high demand for reducing carbon dioxide emissions, the supply of electric vehicles and hybrid electric vehicles is progressing rapidly. High-priority challengeable tasks need to be completed to overcome mileage limitations caused by battery performance and price, and to construct charging infrastructure; however, technically, the perception that electric vehicles are no longer future vehicles is becoming widespread.

Electric vehicles use electricity as power, and power sources mainly include batteries, inverters, and motors. Since the motor is in charge of energy regeneration when driving or decelerating a vehicle, both miniaturization and high power output are required in terms of driving maneuverability and fuel efficiency.

Unlike internal combustion engine vehicles that use a 12 V battery, electric vehicles are designed to be supplied with a battery voltage of about 100 V to about 400 V, and up to a high voltage of 650 V, with a booster circuit installed in some vehicles.

Driving energy needs to be increased to raise the output of an electric motor. When current is increased, the diameter of copper wire needs to be increased. In contrast, by increasing voltage, high output may be obtained while inhibiting an increase in body size, and the motor may be driven by a battery voltage of about 100 V to 400 V in electric vehicles, and up to a high voltage of 650 V, with a booster circuit installed in some vehicles.

Thus, a high-voltage wiring harness system of electric vehicles providing such a high voltage, which is a high-voltage and high-current harness system providing battery power to an electric motor as a main power source, includes a high-voltage electromagnetic shielding wire and a connector.

A motor, a device that converts electrical energy into mechanical energy, generates thermal energy during an energy conversion process. The thermal energy generated thereby acts as a main factor in degrading electrical or mechanical performance. In particular, high-voltage cables that supply electrical energy to the motor need to be developed to provide stable performance in various driving and environmental conditions, and there is a need to manage thermal energy by using an appropriate heat dissipation system when power loss occurs.

Heat dissipation materials have been widely used not only in electronic devices but also in vehicles and LEDs. In the case of vehicles, following the global trend of using electronic parts in vehicle bodies, the demand for electronic devices and power consumption in the vehicle bodies are rapidly increasing. In contrast, the electronic parts used therein are required to be lighter, smaller, and more reliable in function. Due to the high-density integration and the increase in power consumption of electronic devices for vehicles, development of high-performance parts using a high-heat dissipation material is in progress based on the convergence of information technology and automotive technology.

Composite materials in which a highly thermally conductive filler and a polymer material are compounded have been widely used as heat dissipation materials in the current industrial fields. Although such composite materials have advantages of excellent thermal conductivity and high processability, the processability and intrinsic physical properties of the polymer material may deteriorate due to addition of a large amount of the inorganic filler to obtain high thermal conductivity.

In addition, the polymer material generally has a thermal conductivity of about 0.2 W/mK because most lattice vibration mode vibrations (phonons) are scattered without propagating due to various defects existing in the polymer material. Therefore, in order to prepare a composite polymer material having high thermal conductivity, a polymer chain composed of strong covalent bonds should be continuously connected in an unbroken line through the heat conduction path. It has been reported that a thermal conductivity of about 100 W/mK, equivalent to that of a metal, may be obtained when these conditions are satisfied.

Although a number of composite materials of thermally conductive polymers have been developed to overcome the issues described above, fundamental limitations such as considerably low thermal conductivity and high manufacturing costs still remain when compared with inorganic fillers.

DESCRIPTION OF EMBODIMENTS

Technical Problem

As a result of intensive efforts to develop methods of manufacturing lightweight coated insulated wires having improved heat dissipation properties, insulation properties, and flame retardancy, the present inventors have found that the lightweight coated insulated wires may be manufactured using a coating composition including a heat dissipation silicone elastomer compound, which is prepared by adding/mixing a silane-treated anti-tracking agent and chopped strands of a metal-coated fiber yarn treated with an adhesion enhancer to/with a silicone elastomer compound, which has intrinsic properties of both inorganic and organic materials and advantageous physical properties such as excellent heat resistance, chemical resistance, electrical insulation, abrasion resistance, weather resistance, and ozone resistance, thereby completing the present invention.

Solution to Problem

A first aspect of the present invention provides a composition for coating an insulated wire, including a heat dissipation silicone elastomer compound, wherein the heat dissipation silicone elastomer compound includes a silicone elastomer compound, an anti-tracking agent surface-treated with a silane, and chopped strands of a metal-coated fiber yarn treated with an adhesion enhancer.

A second aspect of the present invention provides a method of manufacturing a coated insulated wire including a heat dissipation silicone elastomer compound, the method including: a first step of preparing a heat dissipation silicone elastomer compound; a second step of manufacturing an insulated wire by forming an insulating layer on the outer circumference of a conductor coated with an adhesion enhancer; a third step of forming a light shielding layer on the outer circumference of the insulated wire by braiding a metallic fiber yarn; and a fourth step of forming a coating layer on the outer circumference of the light shielding layer using the heat dissipation silicone elastomer compound.

A third aspect of the present invention provides a coated insulated wire sequentially including: a conductor coated with an adhesion enhancer; an insulating layer; a light shielding layer formed by braiding a metallic fiber yarn coated with an adhesion enhancer; and a coating layer formed of a heat dissipation silicone elastomer compound.

The first aspect of the present invention provides a composition for coating an insulated wire, which includes a heat dissipation silicone elastomer compound, wherein the heat dissipation silicone elastomer compound includes a silicone elastomer compound, an anti-tracking agent surface-treated with a silane, and chopped strands of a metal-coated fiber yarn treated with an adhesion enhancer.

The composition for coating an insulated wire may have improved heat dissipation properties, insulation properties, flame retardancy, and lightweight properties by including the heat dissipation silicone elastomer compound.

As used herein, the term "for coating" refers to the use for covering the outer surfaces of each component layer of an electric wire.

The "silicone elastomer compound" of the present invention has excellent heat resistance, chemical stability, electrical insulation properties, abrasion resistance, weather resistance, and ozone resistance compared to general organic rubbers due to inorganic properties thereof obtained by a siloxane (Si—O) bond in a main chain of a molecular structure.

The "heat dissipation silicone elastomer compound" of the present invention is prepared by adding a heat-dissipating agent to a silicone elastomer compound and may have excellent stability due to heat resistance and insulation properties as well as heat dissipation properties. Specifically, the heat dissipation silicone elastomer compound may include an anti-tracking agent surface-treated with a silane and chopped strands of a metal-coated fiber yarn treated with an adhesion enhancer, but is not limited thereto.

In the "anti-tracking agent surface-treated with a silane", the anti-tracking agent is a material capable of improving the ability of an insulating material to withstand damage due to formation of a conduction path under high-voltage conditions. Via surface treatment with a silane, adhesion between the anti-tracking agent and the silicone elastomer compound may be improved.

The anti-tracking agent may be classified into a metal oxide-type anti-tracking agent and a hydroxide-type anti-tracking agent. In particular, a particle diameter of the anti-tracking agent may be from 10 μm to 50 μm, but is not limited thereto.

The metal oxide-type anti-tracking agent is used to enhance voltage-withstanding properties of an insulating composite material, and examples thereof may be magnesium oxide, aluminum oxide, titanium dioxide, vanadium pentoxide, chromium(III) oxide, iron(III) oxide, nickel oxide, molybdenum trioxide, and tungsten trioxide, which may be used alone or in combination, but are not limited thereto. In particular, when the amount of the metal oxide-type anti-tracking agent is less than 40 parts by weight based on 100 parts by weight of the solvent, economic feasibility decreases, and when the amount is greater than 80 parts by weight, interface adhesion decreases.

The hydroxide-type anti-tracking agent may be used to enhance voltage-withstanding properties of an insulating composite material, and examples thereof may be iron hydroxide, calcium hydroxide, magnesium hydroxide, and aluminum hydroxide, which may be used alone or in combination, but are not limited thereto. In particular, when the amount of the hydroxide-type anti-tracking agent is less than 20 parts by weight based on 100 parts by weight of the solvent, economic feasibility decreases, and when the amount is greater than 60 parts by weight, interface adhesion decreases.

The silane group may be vinyl tris 2-methoxyethoxy silane, tri(isopropoxy)vinylsilane, acryloxy 3-metacryloxy-propyl-trimethoxy silane, β-(3,4-epoxycyclohexyl)-ethyltrimethoxysilane, 3-aminopropyl-triethoxy silane, gamma-ureidopropyltrimethoxysilane, gamma-ureidopropyltriethoxysilane, 3-aminopropyltrimethoxysilane, 3-aminopropyltriethoxysilane, gamma-glycidoxypropyltrimethoxysilane, or gamma-glycidoxypropyltriethoxysilane, which are used alone or in combination, but is not limited thereto. In particular, when the concentration of the silane is less than 1 wt % based on the solvent, interface adhesion between the anti-tracking agent and the silicone elastomer compound decreases, and when the concentration is 2 wt % or greater, economic feasibility decreases.

The expression "chopped strands of the metal-coated fiber yarn treated with an adhesion enhancer" of the present invention refers to chopped strands obtained by cutting a metallic fiber yarn coated with an adhesion enhancer by using a chopping machine equipped with a cutter including blades.

The second aspect of the present invention provides a method of manufacturing a coated insulated wire including a heat dissipation silicone elastomer compound including: a first step of preparing a heat dissipation silicone elastomer compound; a second step of manufacturing an insulated wire by forming an insulating layer on the outer circumference of a conductor coated with an adhesion enhancer; a third step of forming a light shielding layer on the outer circumference of the insulated wire by braiding a metallic fiber yarn; and a fourth step of forming a coating layer on the outer circumference of the light shielding layer using the heat dissipation silicone elastomer compound.

The first step of the present invention may include: i) preparing chopped strands of a metallic fiber yarn surface-treated with a reactive silane; and ii) adding the surface-treated chopped strands obtained in the process i), an anti-tracking agent surface-treated with a silane, and a heat-dissipating agent to the silicone elastomer compound, and mixing a mixture thereof, but is not limited thereto.

The process i) of the first step may include: a) preparing an adhesion enhancer; b) preparing a metallic fiber yarn coated with the adhesion enhancer; and c) preparing chopped strands of the metallic fiber yarn coated with the adhesion enhancer by using a chopping machine equipped with a cutter including blades spaced apart from one another at an interval of 0.5 mm to 6 mm, but is not limited thereto.

The interval between the blades may be from 0.5 mm to 6 mm, more specifically, from 0.5 mm to 3 mm. In particular, when the interval between the blades is less than 0.5 mm, processability of cutting a filament yarn may deteriorate, and when the interval is greater than 6 mm, blendability of the chopped strands with the silicone elastomer compound may deteriorate.

More specifically, the process i) of the first step will be performed by the following steps:

an adhesion enhancer preparation step to prepare an adhesion enhancer by adding to an impregnation vessel, which is equipped with a stirrer and a temperature controller, 100 to 200 parts by weight of triazinethiol propenyl dimethylpolysiloxane or triazinethiol butenyl dimethylpolysiloxane based on 100 parts by weight of a solvent, followed by mixing the mixture at a rate of 10 RPM to 200 RPM;

an adhesion enhancer coating step to prepare a metal-coated fiber yarn coated with the adhesion enhancer by passing a metal-coated fiber yarn through the impregnation vessel containing the adhesion enhancer, which is prepared in the adhesion enhancer preparation step and which is maintained at a temperature of 20° C. to 30° C. at a rate of 1 m/min to 100 m/min, and then through a drying furnace, which is maintained at a temperature of 60° C. to 100° C.; and a chopped strand preparation step to prepare chopped strands of the metal-coated fiber yarn coated with the adhesion enhancer by cutting the metal-coated fiber yarn coated with the adhesion enhancer, which is prepared in the adhesion enhancer coating step, by using a chopping machine equipped with a cutter including blades spaced apart from one another at an interval of 0.5 mm to 6 mm, but the process i) of the first step is not limited thereto.

Specifically, the process ii) of the first step will be performed by the following steps:

a silane treatment step to prepare an anti-tracking agent surface-treated with a silane by adding to a reactor 1 to 2 parts by weight of a silane based on 100 parts by weight of a solvent, followed by stirring the resultant at a rate of 100 RPM to 500 RPM for 30 to 120 minutes. Thereafter, 20 to 60 parts by weight of a hydroxide-type anti-tracking agent is added thereto. 1 to 2 parts by weight of a silane and 100 parts by weight of a solvent are added to a separate reactor, which is equipped with a temperature controller and a stirrer, and then the mixture is stirred at a rate of 100 RPM to 500 RPM for 30 to 120 minutes, and 40 to 80 parts by weight of a metal oxide-type anti-tracking agent is added thereto, followed by mixing the above mixture at a rate of 100 RPM to 1,000 RPM for 30 to 120 minutes, filtering, and drying at a temperature of 40° C. to 80° C.;

a silicone elastomer compound preparation step to prepare a silane elastomer compound by adding to a mixer 12 to 20 parts by weight of hydrogen siloxane copolymers, 30 to 120 parts by weight of reinforcement silica, 0.005 to 0.15 parts by weight of a polymerization catalyst, and 0.01 to 0.15 parts by weight of a crosslinking retardant based on 100 parts by weight of vinyl terminated poly(methylvinyl)siloxane and mixing a mixture thereof, followed by mixing while heating at a temperature of 140° C. to 180° C., nitrogen purging, and cooling; and a heat dissipation silicone elastomer compound preparation step performed by sequentially adding 0.1 to 50 parts by weight of the chopped strands of the metal-coated fiber yarn prepared in the chopped strand preparation step, 0.1 to 100 parts by weight of the anti-tracking agent surface-treated with the silane prepared in the silane treating step, 0.1 to 200 parts by weight of a heat-dissipating agent, 0.05 to 2 parts by weight of a pigment, and 0.05 to 1 parts by weight of a processing aid to 100 parts by weight of the silicone elastomer compound prepared in the silicone elastomer compound preparation step and mixing them, but the process ii) of the first step is not limited thereto.

For example, the heat-dissipating agent may include at least one selected from the group consisting of silicon carbide, aluminum nitride, and boron nitride, and may be contained in an amount of 0.1 to 200 parts by weight. When the amount of the heat-dissipating agent is less than 0.1 parts by weight, heat dissipation properties deteriorate, and when the amount is greater than 200 parts by weight, physical properties of the heat dissipation compound deteriorate and economic feasibility decreases.

The "second step" of the present invention, i.e., manufacturing of an insulated wire by forming an insulating layer on the outer circumference of a conductor coated with an adhesion enhancer, may be performed by including the following steps:

a conductor coating step to prepare a conductor coated with the adhesion enhancer by passing a conductor, which is formed by being coated with a single metal, an alloy, or a metal, through the impregnation vessel containing the adhesion enhancer, which is prepared in the adhesion enhancer preparation step and which is maintained at a temperature of 20° C. to 30° C. at a rate of 1 m/min to 100 m/min, and then through a drying furnace maintained at a temperature of 60° C. to 100° C.; and an insulating layer forming step to form an insulating layer on the outer circumference of the conductor coated with the adhesion enhancer via extrusion coating by passing the conductor coated with the adhesion enhancer, which is prepared in the conductor coating step, through a head of a rubber extruder mounted with an extrusion die at a rate of 1 m/min to 100 m/min while supplying the prepared heat dissipation silicone elastomer compound into the rubber feeder mounted on the rubber extruder, but the second step is not limited thereto.

The "third step" of the present invention may be performed by including i) crosslinking the insulated wire formed in the second step; and ii) braiding a metallic fiber yarn coated with an adhesion enhancer on the outer circumference of the crosslinked insulated wire, but is not limited thereto.

More specifically, the third step may be performed by including the following steps:

an insulating layer crosslinking step to form an insulated wire by crosslinking the insulating layer while passing the conductor provided with the insulating layer, which is prepared in the insulating layer forming step, through a crosslinking line mounted with a heater box and maintained at a temperature of 300° C. to 500° C., and a light shielding layer forming step to form an insulated wire having a light shielding layer by braiding the metallic fiber yarn coated with the adhesion enhancer prepared in the adhesion enhancer coating step on the outer circumference of the insulated wire prepared in the insulating layer crosslinking step by using a braiding machine commonly used in the art, but the third step is not limited thereto.

The "fourth step" of the present invention may be performed by including the following steps:

a coating layer forming step to form a heat dissipation silicone elastomer coating layer on the outer circumference of the insulated wire on which the light shielding layer is formed by extrusion coating the insulated wire having the light shielding layer, which is prepared in the light shielding layer forming step, through the head of the rubber extruder mounted with the extrusion die at a speed of 1 m/min to 50 m/min while suppling the heat dissipation silicone elastomer compound prepared in the heat dissipation silicone elastomer compound mixing step into the rubber feeder mounted on the rubber extruder; and a step of forming a heat dissipation silicone insulated wire to crosslink the coating layer while passing the insulated wire having the coating layer, which is prepared in the coating layer forming step, through the crosslinking line mounted with a heater box and maintained at a temperature of 300° C. to 500° C., but the fourth step is not limited thereto.

The third aspect of the present invention provides a coated insulated wire: sequentially including: a conductor coated with an adhesion enhancer; an insulating layer; a light shielding layer formed by braiding a metallic fiber yarn coated with an adhesion enhancer; and a coating layer formed of a heat dissipation silicone elastomer compound.

The "heat dissipation silicone elastomer compound" may be included not only in the coating layer but also in the insulating layer.

The "adhesion enhancer" may be formed by adding triazinethiol propenyl dimethylpolysiloxane or triazinethiol butenyl dimethylpolysiloxane, but is not limited thereto.

The metallic fiber yarn may be a fiber yarn coated with a metal and having a metal coating thickness of 0.01 μm to 10 μm. In particular, when the coating thickness of the metal is less than 0.01 μm, heat dissipation properties deteriorate, and when the coating thickness of the metal is greater than 10 μm, lightweight properties deteriorate.

Specifically, the metallic fiber yarn may be composed of 50 to 3,000 filaments, and each filament may have a diameter of 1 μm to 40 μm. In particular, when the number of filaments is less than 50, economic feasibility decreases, and when the number of filaments is 3,000 or more, processability deteriorates due to damage to cutting blades. When the diameter of the filament is less than 1 μm, reinforcement of the chopped strands for a polymer resin and an elastomer deteriorates, and when the diameter is 40 μm or greater, blendability of the cut chopped strands with the polymer resin or the elastomer deteriorates.

The metal of the metallic fiber yarn may include at least one selected from the group consisting of nickel, copper, silver, gold, iron, and tin, but is not limited thereto.

The fiber yarn may include at least one selected from the group consisting of carbon fiber, fiberglass, alumina fiber, ceramic fiber, aramid fiber, and carbon nanofiber. Specifically, the fiber yarn may include carbon fiber, fiberglass, alumina fiber, or ceramic fiber, but is not limited thereto.

The coated insulated wire of the present invention may be a wire for electric vehicles, but is not limited thereto.

Wiring of electric vehicles requires a high-voltage wiring harness system including a high-voltage electromagnetic shielding cable, a connector, and a heat dissipation system to prevent performance deterioration caused by heat generated while a motor converts electrical energy into mechanical energy. The coated insulated wire according to the present invention, which has improved heat dissipation properties and increased breakdown voltage, may be used as wires for electric vehicles.

Advantageous Effects of Disclosure

By applying the heat dissipation silicone elastomer compound, which is prepared by mixing the silicone elastomer compound with the anti-tracking agent surface-treated with a silane and the chopped strands of the metal-coated fiber yarn treated with the adhesion enhancer, to coating of an insulated wire, it is confirmed that dispersity, tensile strength, thermal conductivity, and breakdown voltage are improved, and thus a high-voltage lightweight coated insulated wire may be provided. Therefore, the demand for compact and lightweight wires having high heat dissipation properties in accordance with recent high-density integration and increases in power consumption of electronic devices may be satisfied.

BEST MODE

Hereinafter, the present invention will be described in more detail with reference to the following examples. However, these examples are for illustrative purposes only and are not intended to limit the scope of the present invention.

EXAMPLE 1

1.1 Preparation of Heat Dissipation Silicone Elastomer Compound 2,000 parts by weight of ethanol and 3-aminopropyltrimethoxysilane were added to a reactor equipped with a temperature controller and a stirrer and mixed at a rate of 300 RPM for 30 minutes, and then 500 g of aluminum hydroxide was added thereto and stirred at 20° C. for 30 minutes. Then, the resultant was filtered, washed while spraying 200 g of ethanol thereonto, and dried in a vacuum oven maintained at 60° C. for 6 hours to prepare an aluminum hydroxide anti-tracking agent treated with 3-aminopropyltrimethoxysilane.

2,000 parts by weight of ethanol and 3-aminopropyltrimethoxysilane were added to a reactor equipped with a temperature controller and a stirrer and mixed at a rate of 300 RPM for 30 minutes, and then 800 g of molybdenum oxide was added thereto and stirred at 20° C. for 30 minutes. Then, the resultant was filtered, washed while spraying 200 g of ethanol thereonto, and dried in a vacuum oven maintained at 60° C. for 6 hours to prepare a molybdenum oxide anti-tracking agent treated with 3-aminopropyltrimethoxysilane.

500 g of ethanol and 500 g of triazinethiol propenyl dimethylpolysiloxane were added to an impregnation vessel equipped with a stirrer and a temperature controller and mixed at a rate of 100 RPM to prepare an adhesion enhancer.

A metal-coated fiber yarn was passed through the impregnation vessel containing the adhesion enhancer prepared in the adhesion enhancer preparation step and maintained at a temperature of 20° C. to 30° C. at a rate of 1 m/min to 100 m/min and then through a drying furnace maintained at a temperature of 60° C. to 100° C. to prepare a metal-coated fiber yarn coated with the adhesion enhancer.

A copper-coated carbon fiber yarn including 800 filaments each having a diameter of 20 μm was passed through the impregnation vessel containing the adhesion enhancer maintained at 25° C. at a rate of 5 m/min and then through a drying furnace maintained at 100° C. to prepare a copper-coated carbon fiber yarn surface-treated with triazinethiol propenyl dimethylpolysiloxane.

The copper-coated carbon fiber yarn surface-treated with triazinethiol propenyl dimethylpolysiloxane was cut using a chopping machine equipped with a cutter including blades spaced apart from one another at an interval of 1 mm to prepare chopped strands.

4,250 g of vinyl-terminated poly(methylvinyl)siloxane having a viscosity of 450,000 cP and 1 mmol/parts by weight of vinyl groups, 750 g of hydrogen siloxane polymer having a viscosity of 80 cP and 1.5 mmol/parts by weight of hydrogen radicals, 4,999 g of reinforcement silica, 0.25 g of a polymerization catalyst, and 0.75 g of 1-ethynyl-1-cyclohexanol (crosslinking retardant) were added to a change can mixer and mixed, followed by heat-kneading at 160° C., nitrogen purging, and cooling, thereby preparing a silicone elastomer compound.

10,000 g of the silicone elastomer compound, 2,000 g of the chopped strands of the copper-coated fiber yarn, 10,000 g of the anti-tracking agent surface-treated with the silane (mixture of aluminum hydroxide and molybdenum oxide mixed at 1:1), 10,000 g of the heat-dissipating agent, 20 g of a pigment, and 30 g of a processing aid were sequentially added to a mill mixer and mixed to prepare a heat dissipation silicone elastomer compound.

1.2 Formation of Insulating Layer

A conductor formed of copper and having an outer diameter of 5 mm was passed through the impregnation vessel containing the adhesion enhancer and maintained at 25° C. at a rate of 5 m/min and then through a drying furnace maintained at 100° C. to prepare a copper conductor surface-treated with triazinethiol propenyl dimethylpolysiloxane.

The copper conductor surface-treated with triazinethiol propenyl dimethylpolysiloxane was extrude-coated by being passed through a head of a rubber extruder mounted with an extrusion die at a rate of 5 m/min whiling supplying the heat dissipation silicone elastomer compound into a rubber feeder mounted on the rubber extruder, thereby forming an insulating layer.

The conductor on which the insulating layer was formed was passed through a crosslinking line mounted with a heater box and maintained at 450° C. to prepare an insulated wire having a crosslinked insulating layer.

1.3 Formation of Light Shielding Layer

A light shielding layer was formed on the outer circumference of the prepared insulated wire by braiding the copper-coated carbon fiber yarn surface-treated with triazinethiol propenyl dimethylpolysiloxane using a 24-weight braiding machine.

1.4 Formation of Coating Layer

The insulated wire on which the heat dissipation silicone elastomer compound was formed was extrude-coated while being passed through a head of a rubber extruder mounted with an extrusion die while supplying a rubber feeder mounted on the rubber extruder, thereby forming a coating layer.

The insulated wire on which the coating layer was formed was crosslinked by being passed through a crosslinking line mounted with a heater box and maintained at 450° C., thereby completing preparation of a heat dissipation silicone elastomer compound-containing coated insulated wire having a light shielding layer for electric vehicles.

COMPARATIVE EXAMPLE 1

1.1 Preparation of Heat Dissipation Silicone Elastomer Compound

A heat dissipation silicone elastomer compound was prepared in the same manner as in Example 1.1 above except that chopped strands of the copper-coated fiber yarn were not used.

1.2 Formation of Insulating Layer

An insulating layer was formed in the same manner as in Example 1.2 above except that triazinethiol propenyl dimethylpolysiloxane as the adhesion enhancer was not used.

1.3 Formation of Light Shielding Layer

A light shielding layer was formed in the same manner as in Example 1.3 above, except that a tin-plated wire was used instead of the copper-coated carbon fiber yarn surface-treated with triazinethiol propenyl dimethylpolysiloxane.

1.4 Formation of Coating Layer

A coating layer was formed in the same manner as in Example 1.4 by using the heat dissipation silicone elastomer compound prepared in Comparative Example 1.1 above.

Experimental Example: Measurement of Dispersity, Tensile Strength, Thermal Conductivity, and Breakdown Voltage Tensile strength of the insulated or coated samples prepared as described above was measured by preparing dumbbell samples according to IEC 60811-1-1 standards and measuring tensile strength thereof using a universal testing machine at a rate of 200 mm/min, and thermal conductivity was measured by using samples having a thickness of 0.1 mm to 0.4 mm with a laser flash analyzer (LFA).

TABLE 1

|  | Dispersity | Tensile strength (MPa) | Thermal conductivity (W/mK) | Breakdown voltage (KV) |
|---|---|---|---|---|
| Example 1 | Excellent | 4.0 | 0.34 | 22 |
| Comparative Example 1 | Bad | 2.5 | 0.15 | 18 |

As shown in Table 1 above, it may be confirmed that the sample according to Example 1 had improved voltage resistance, tensile strength, and thermal conductivity compared with that of Comparative Example 1. That is, it may be found that effects may vary according to application of chopped strands of a metallic fiber yarn of the coating layer, application of the adhesion enhancer of the insulating layer, and application of a metallic fiber yarn coated with the adhesion enhancer to the light shielding layer.

Figure 1:
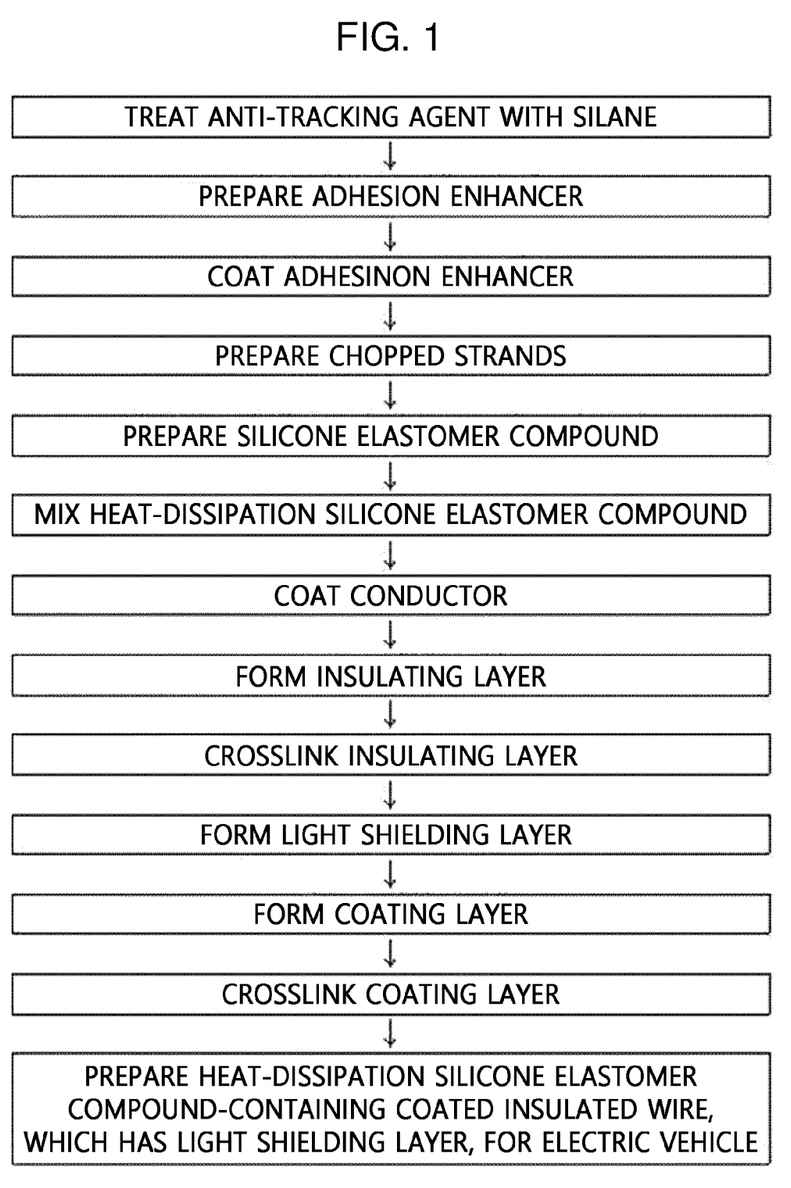
FIG. 1 is a flowchart of a method of manufacturing a heat dissipation silicone elastomer compound-coated insulated wire having a light shielding layer.
Figure 2:
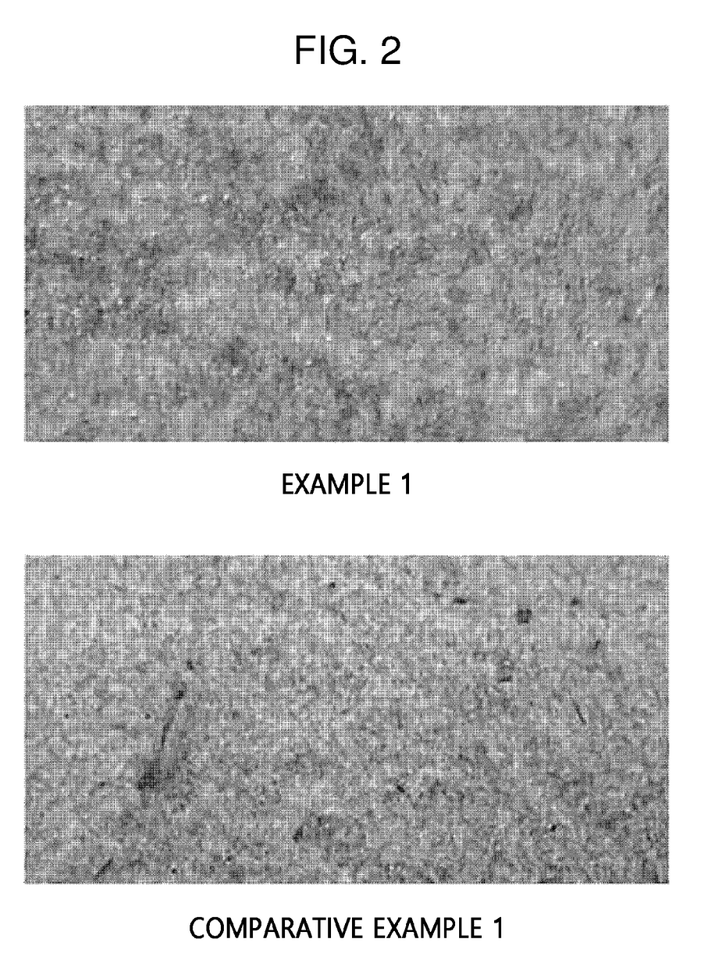
FIG. 2 shows microscope images according to Example 1 and Comparative Example 1.
Figure 3:
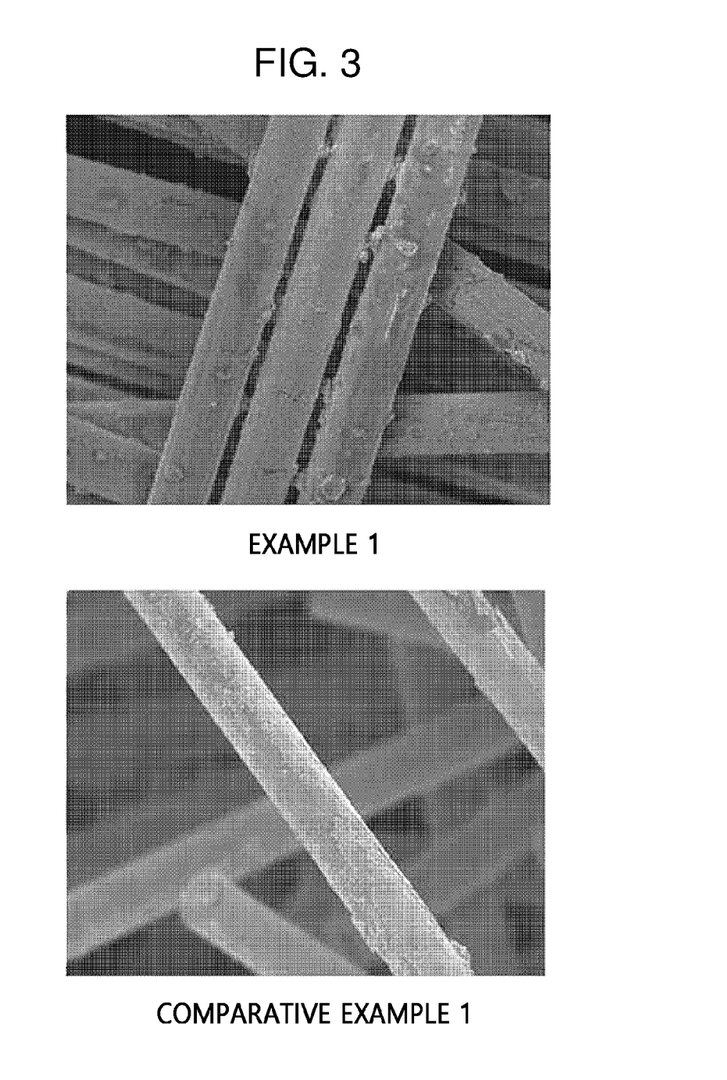
FIG. 3 shows electron microscope images of chopped strands according to Example 1 and Comparative Example 1.

In addition, as shown in FIG. 2, it was confirmed that the dispersity may also be improved without entanglement of chopped strands according to Example 1 when compared with Comparative Example 1. As shown in FIG. 3, it was confirmed that the silane was uniformly coated on the surface of the metal-coated fiber yarn according to Example 1, unlike in Comparative Example 1.

The invention claimed is:

1. A coated insulated wire sequentially comprising:
   a conductor coated with an adhesion enhancer;
   an insulating layer;
   a light shielding layer formed by braiding a metallic fiber yarn coated with an adhesion enhancer; and
   a coating layer formed of a heat dissipation silicone elastomer compound.

2. The coated insulated wire of claim 1, wherein the insulating layer further comprises the heat dissipation silicone elastomer compound.

3. The coated insulated wire of claim 1, wherein the adhesion enhancer is formed by adding triazinethiol propenyl dimethylpolysiloxane or triazinethiol butenyl dimethylpolysiloxane.

4. The coated insulated wire of claim 1, wherein the metallic fiber yarn is a fiber yarn coated with a metal and having a metal coating thickness of 0.01 μm to 10 μm.

5. The coated insulated wire of claim 4, wherein the metal comprises at least one selected from the group consisting of nickel, copper, silver, gold, iron, and tin.

6. The coated insulated wire of claim 4, wherein the fiber yarn comprises at least one selected from the group consisting of carbon fiber, fiberglass, alumina fiber, ceramic fiber, aramid fiber, and carbon nanofiber.

7. The coated insulated wire of claim 1, wherein the metallic fiber yarn comprises 50 to 3,000 filaments each having a diameter of 1 μm to 40 μm.

8. The coated insulated wire of claim 1, wherein the coated insulated wire is a wire for an electric vehicle.

* * * * *